United States Patent [19]
Suda et al.

[11] Patent Number: 4,597,659
[45] Date of Patent: Jul. 1, 1986

[54] IN-FOCUS STATE DISPLAY DEVICE FOR CAMERA

[75] Inventors: Yasuo Suda; Kiyoshi Alyfuku; Akio Sunouchi; Nobuyuki Suzuki, all of Kanagawa, Japan

[73] Assignee: Canon Kabushiki Kaisha, Tokyo, Japan

[21] Appl. No.: 613,592

[22] Filed: May 23, 1984

[30] Foreign Application Priority Data

May 26, 1983 [JP] Japan ................... 58-92896

[51] Int. Cl.⁴ ............................................. G03B 3/00
[52] U.S. Cl. ................................................. 354/409
[58] Field of Search ............... 354/409, 467, 471–475, 354/155, 195.13, 199–201, 219, 224, 225, 289.1, 289.12

[56] References Cited
FOREIGN PATENT DOCUMENTS 106225 8/1979 Japan ............................ 354/409
155337 12/1980 Japan ............................ 354/409

*Primary Examiner*—William B. Perkey
*Attorney, Agent, or Firm*—Toren, McGeady, Stanger, Goldberg & Kiel

[57] ABSTRACT

The disclosed camera includes a view finder whose visual field displays a mark indicative of a focused condition. A display which extinguishes the mark either immediately after the detection of the in-focus condition or a predetermined time after the detection of the in-focus state condition, and generates an audible or visual mark outside the view finder's visual field.

9 Claims, 14 Drawing Figures

IN-FOCUS STATE DISPLAY DEVICE FOR CAMERA

BACKGROUND OF THE INVENTION

1. Field of the Invention

This invention relates to a camera having a display device for forming a display within a view finder and more particularly a display device for effecting a display that indicates that the camera is in focus.

2. Description of the Prior Art

Heretofore, cameras incorporating a focus detecting device have included a display device for displaying a mark outside the visual field of the view finder which indicates the direction in which a lens should be turned for focusing. The display device of this type, however requires operation of the distance ring of the lens while watching the direction indicating mark. The distance ring cannot be operated while watching a distance measuring target, i.e., an object to be photographed. This presents a great inconvenience. A recently proposed method, called the superimposed display method attempts to eliminate this inconvenience by superimposing a display on an object image within the view finder visual field of the camera. In this display method, a lens-turning direction indicating mark is displayed by superimposing it near a distance measuring target to permit a photographer to focus while simultaneously watching both the object and the indicating mark.

FIGS. 1 and 2 of the accompanying drawings show display devices of conventional methods. The display device of FIG. 1 displays a lens-turning direction indicating mark outside the visual field of the view finder. The illustration shows the view finder's visual field 1; a distance measuring area 2; lens-turning direction indicating marks 103a and 103b; an in-focus mark 103c and a light measurement range 4. Focus detection is performed according to the image of the distance measuring area 2. The distance ring of a photo-taking lens is turned leftward when the lens-turning direction indicating mark 103a lights up and rightward when the mark 103b lights up. The in-focus mark 103c is arranged to light when the lens is in focus. FIG. 2 shows a display device of the superimposed display type. The illustration of FIG. 2 shows a view finder's visual field 1; a distance measuring area 2; lens-turning direction indicating marks 3a and 3b; and a light measuring area range 4. In this device, the lens-turning direction indication mark 3a or 3b lights up to indicate that the distance ring of the phototaking ring is to be turned to the left or to the right; both of these indicating marks light up to indicate an in-focus state.

Normally, a focusing operation should be performed while watching an object image. Hence it is an important feature of a single-lens reflex camera that a focusing operation can be performed while watching the blurred degree of the object image. The FIG. 2 prior art device is superior to the FIG. 1 prior art device in achieving this goal. However, the superimposed display of an in-focus state within the view finder visual field eclipse part of the object image. Such an eclipse not only hinders photographic operation but also presents the following problem: Both the lens-turning direction indicating marks 3a and 3b might be erased in the in-focus condition. Then, since the photographer has been positively informed of an out-of-focus state, the absence of any display of an in-focus condition is undesirable because it may give a photographer a psychologically uneasy feeling. In other words, the photographer might mistake an in-focus state for a malfunction of the focus detecting device, disappearance of the display due to a power supply voltage drop, or a condition in which the focus is not detectable.

Although the prior art arrangement of having a superimposed display of the lens-turning direction indicating mark near the distance measuring part is highly advantageous for focusing, it has been unsatisfactory for effectively displaying an in-focus state.

SUMMARY OF THE INVENTION

It is an object of the present invention to provide a camera having a focused state display device of the above-stated superimposed display type which not only accurately shows an out-of-focus state and an in-focus state but also does not hinder photographing operation.

It is another object of the invention to provide a device which includes a first focus display element for displaying an in-focus state outside the visual field of a view finder and a second focus display element for displaying a focused state within the view finder visual field. The device inhibits the second focus display element from making any display and puts out the light of the focused state display made within the view finder visual field after the first focus display element begins to operate.

It is a further object of the invention to provide a display device which makes a visible display and an audible display wherein, when an in-focus state of the image of an object to be photographed is visually confirmed, a visible display is put out and is replaced by an audible display of the in-focus state for the purpose of permitting accurate composition of a picture to be taken.

These and further objects and features of the invention will become apparent from the following description of the preferred embodiments thereof taken in connection with the accompanying drawings.

BRIEF DESCRIPTION OF THE DRAWINGS

FIG. 4 shows a display indicating that the lens is to be turned leftward; FIG. 5 shows a display indicating that the lens is to be turned rightward; FIGS. 6 and 7 show displays indicating in-focus states respectively; and FIG. 8 shows a display indicating a focus not detectable condition.

DETAILED DESCRIPTION OF THE PREFERRED EMBODIMENTS

Figure 3:
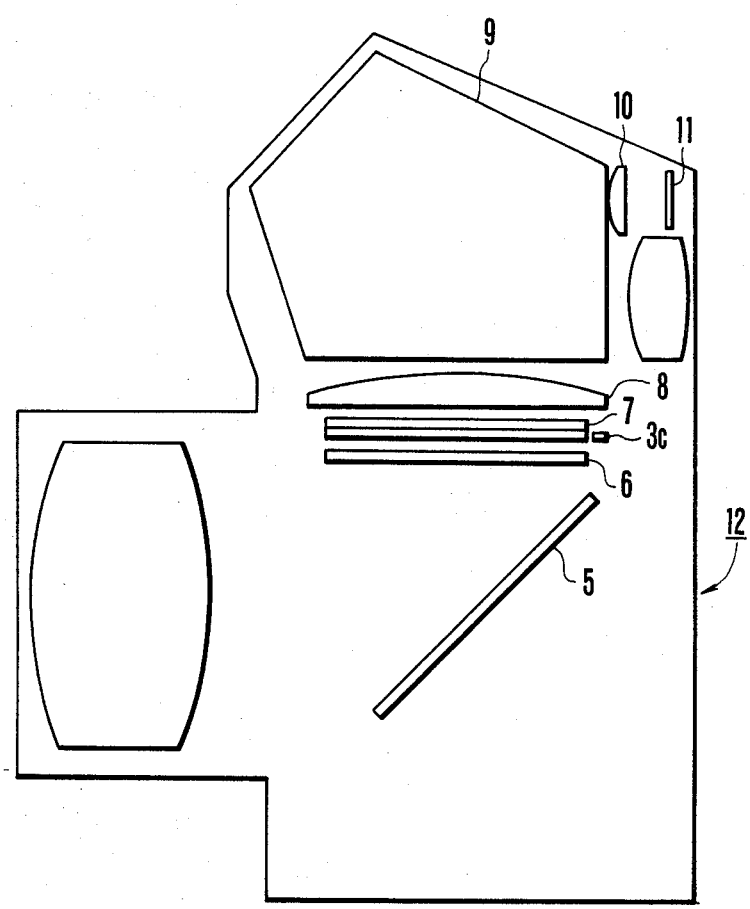
FIG. 3 is a sectional view showing the photometric optical system and the view finder optical system of a camera arranged according to the present invention.

An embodiment of this invention arranged to make displays is shown in FIGS. 3 to 8. FIG. 3 shows the optical system of a view finder display device arranged in a camera 12 according to the invention. FIG. 3 includes a tilting mirror 5 arranged to guide a light flux coming through a photo-taking lens to the view finder optical system; a focusing plate 6; a guest-host phase transition-type liquid crystal display plate 7 arranged to display lens-turning direction indicating marks within the view finder; a condenser lens 8; a penta-Dach prism 9; a light measuring lens 10 arranged to project an image formed on the focusing plate onto a photo-sensitive element; the photo-sensitive element 11; and an in-focus state displaying LED 3c.

Figure 1:
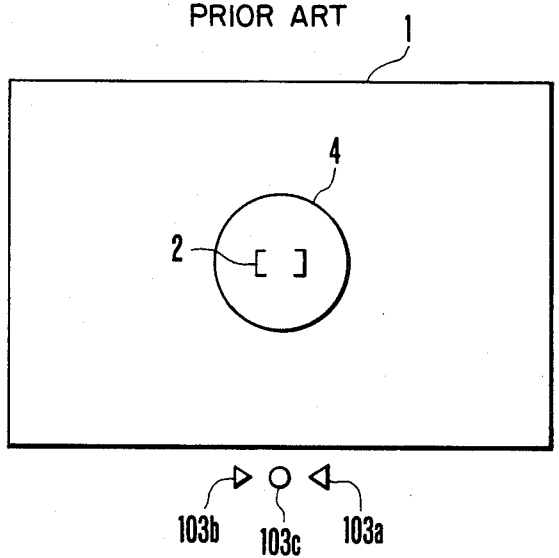
FIGS. 1 and 2 are illustrations of the display devices of conventional cameras arranged to show lens turning directions and an in-focus state.
Figure 2:
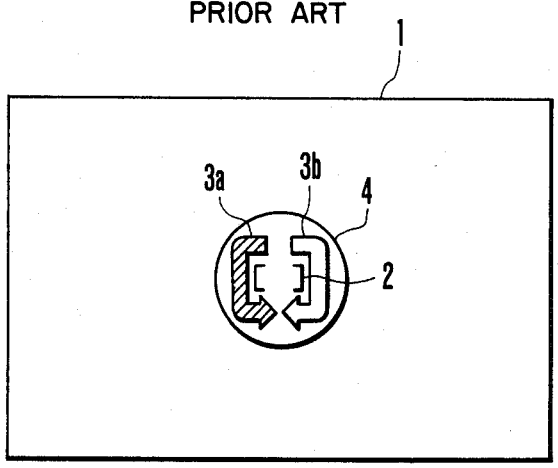

FIGS. 4 to 8 are illustrations of the view finder display device. In these drawings, the same reference numerals are used as in FIGS. 1 and 2. These illustrations show a view finder visual field 1; a distance measuring area 2 indicating the range of an image to be used for focus detection; lens-turning direction indicating marks 3a and 3b arranged to indicate the direction in which a lens is to be turned according to the output of a focus detecting device; and a light measuring range 4. Lens-turning direction indicating marks 3a and 3b are arranged to be displayed by means of the liquid crystal display plate 7 which is disposed in an optical path close to the focusing plate 6. Meanwhile, LED 3c for displaying an in-focus state is disposed outside the frame of the view finder visual field 1. The display device shown is of the superimposing-type and is arranged to display the lens-turning direction indicating mark 3a and 3b or an in-focus state within the view finder visual field. However, display of an in-focus state by means of the above-stated indicating marks 3a and 3b is put out and is replaced by a non-superimposing display of the in-focus state made by means of the LED 3c disposed outside the view finder visual field either immediately or after the lapse of a predetermined length of time following the generation of an in-focus state display signal.

Figure 4:
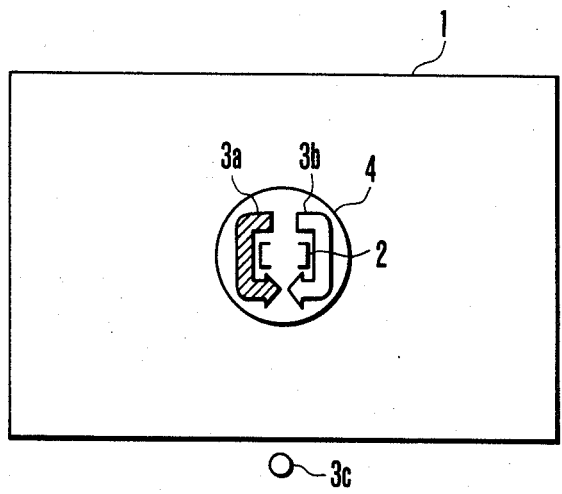
FIGS. 4, 5, 6, 7, and 8 are illustrations of a display device for a camera embodying the invention.
Figure 5:
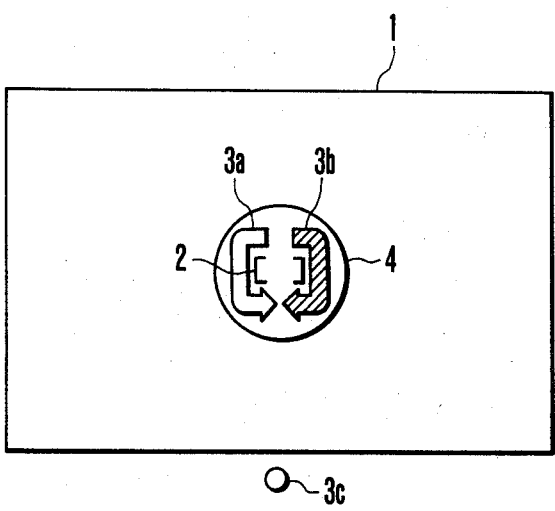
Figure 6:
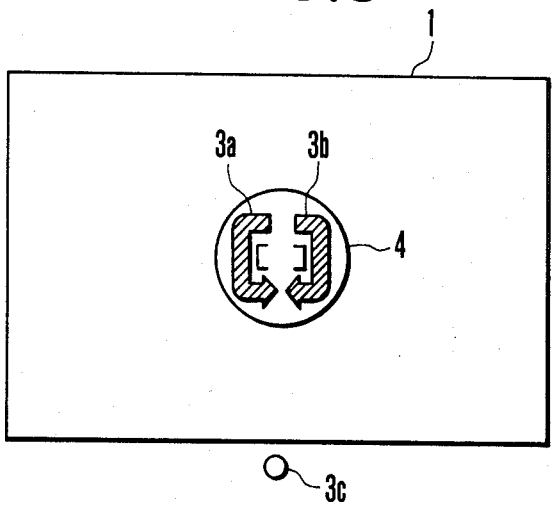
Figure 7:
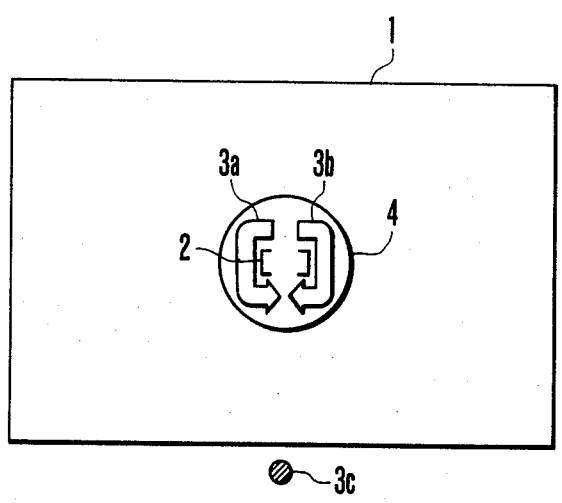
Figure 8:
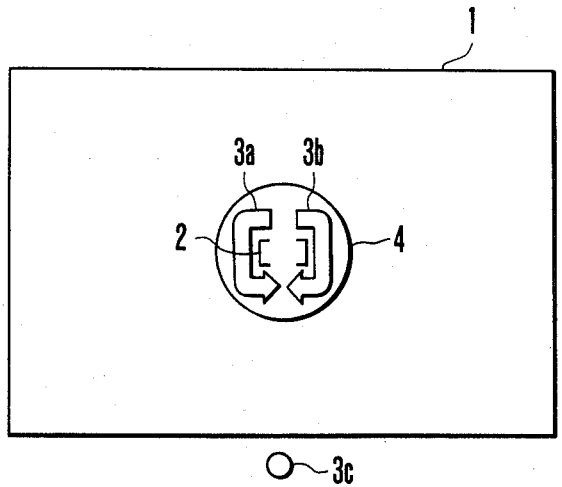

The modes of the displays to be made by the display device are as shown in FIGS. 4 to 8. FIG. 4 shows a display in which the indicating mark 3a alone lights up to indicate that the distance ring of a photo-taking lens must be turned leftward. FIG. 5 shows a display in which the indicating mark 3b alone lights up to indicate that the ring of the lens must be turned rightward. An in-focus state can be attained by turning the distance ring of the photo-taking lens in accordance with the above-state turning direction indicating mark. When an in-focus state is attained, both indicating marks 3a and 3b light up to make an in-focus state display in the superimposed manner. However, either immediately after the superimposed delay of the in-focus state or after the lapse of a predetermined length of time following the display, for example, one second, the display light of the indicating marks 3a and 3b is extinguished. Concurrently with this extinguishment, the in-focus state displaying LED 3c disposed outside the view finder visual field lights up to indicate the in-focus state, as shown in FIG. 7.

Where the lens turning direction is not determinable by the focus detecting device, all the indicating marks 3a and 3b and the in-focus state display LED 3c remain extinguished as shown in FIG. 8. In FIGS. 4 to 8, the contours of the lens-turning directions indicating marks 3a and 3b are depicted only for the sake of illustration. Actually, they are invisible when the display is extinguished. Therefore, they never hinder photographing operation.

Figure 9:
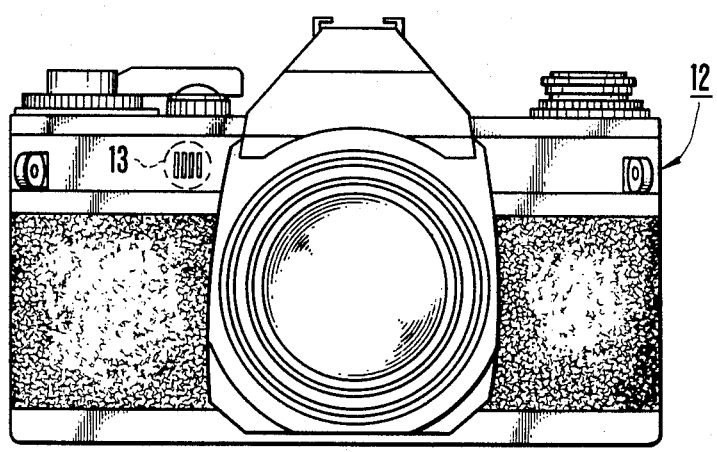
FIG. 9 shows another embodiment of the invention in which an in-focus state is indicated by means of a sound.

In the embodiment described, the superimposed display of an in-focus state is shifted to the in-focus state display by the LED disposed below the view finder visual field. However, instead of the in-focus state display by the LED, the superimposed in-focus state display may be shifted to an in-focus state display means of a sound. FIG. 9 shows a camera provided with a sound producing element for that purpose. In FIG. 9, reference numeral 12 denotes a camera body and numeral 13 the sound producing element.

Figure 10:
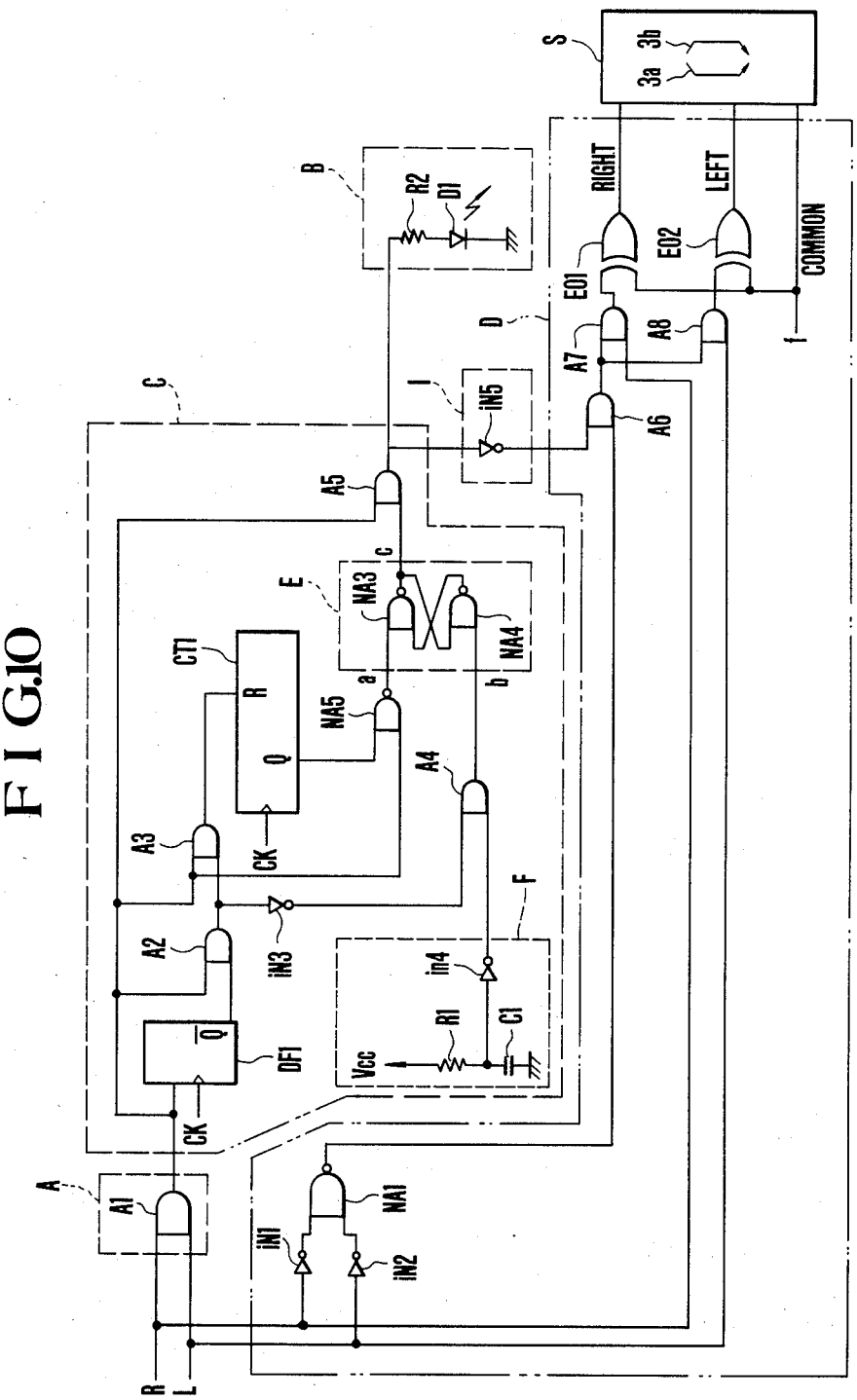
FIG. 10 is a circuit diagram showing the electric circuit arrangement of the embodiment shown in FIGS. 4 to 8.

FIG. 10 is a circuit diagram showing the control circuit arrangement for the embodiment of the invention described in the foregoing. In the circuit diagram, block A indicates and AND gate A1 which is arranged to detect in-focus state detection signals produced from a distance measuring device (not shown). The focused state detection signals received by the AND gate A1 from the distance measuring device are indicated by reference symbols R and L. Signals R and L are obtained in the same manner as in known distance measuring devices. However, a circuit, for example, as disclosed in Japanese Laid-Open Patent Application No. SHO 55-155337, may be used to obtain these signals. Block B indicates a first in-focus state display element arranged outside the view finder visual field to display an in-focus state by means of a light emitting diode (LED). Block C indicates an operation circuit for the first in-focus state display element. Block D indicates an operation circuit for second in-focus state display elements. Reference symbol DF1 denotes a D flip-flop arranged to receive the output of the AND gate A1. Another AND gate A2 is arranged to receive the outputs of the flip-flop DF1 and the AND gate A1 to produce a signal which is supplied to an inverter IN3 and an AND gate A3. The AND gate A3 is arranged to receive the signals from the AND gates A2 and A1. Counter CT1 is arranged to begin to count in response to a signal from the AND gate 3 and to produce a count signal from its output terminal Q at the end of every predetermined count. The output from the output terminal Q of the counter CT1 and the signal of the AND gate A1 are supplied to a NAND gate NA5. The output "a" of the NAND gate NA5 is supplied to a latch circuit E formed by NAND gates NA3 and NA4.

Block F indicates a start circuit formed by a resistor R1, a capacitor C1 and an inverter in4. AND gate A4 is arranged to receive signals from an inverter in 3 and the start circuit F to produce an output "b" which is supplied to the latch circuit E. AND gate A5 is arranged to receive the signal from the AND gate A1 and a signal "c" from the latch circuit E to operate the light emitting diode D1 of the first display element B according to these signals. The operation circuit D is composed of inverter in1 and in2; and NAND gate NA1; AND gates A6, A7 and A8; exclusive OR gates EO1 and EO2 and an input terminal "f" which is arranged to receive a reference pulse signal (not shown). Block I is an inhibit circuit having an inverter in5 arranged to invert the signal produced from the AND gate A5 and to supply the inverted signal to the AND gate A6.

Figure 11:
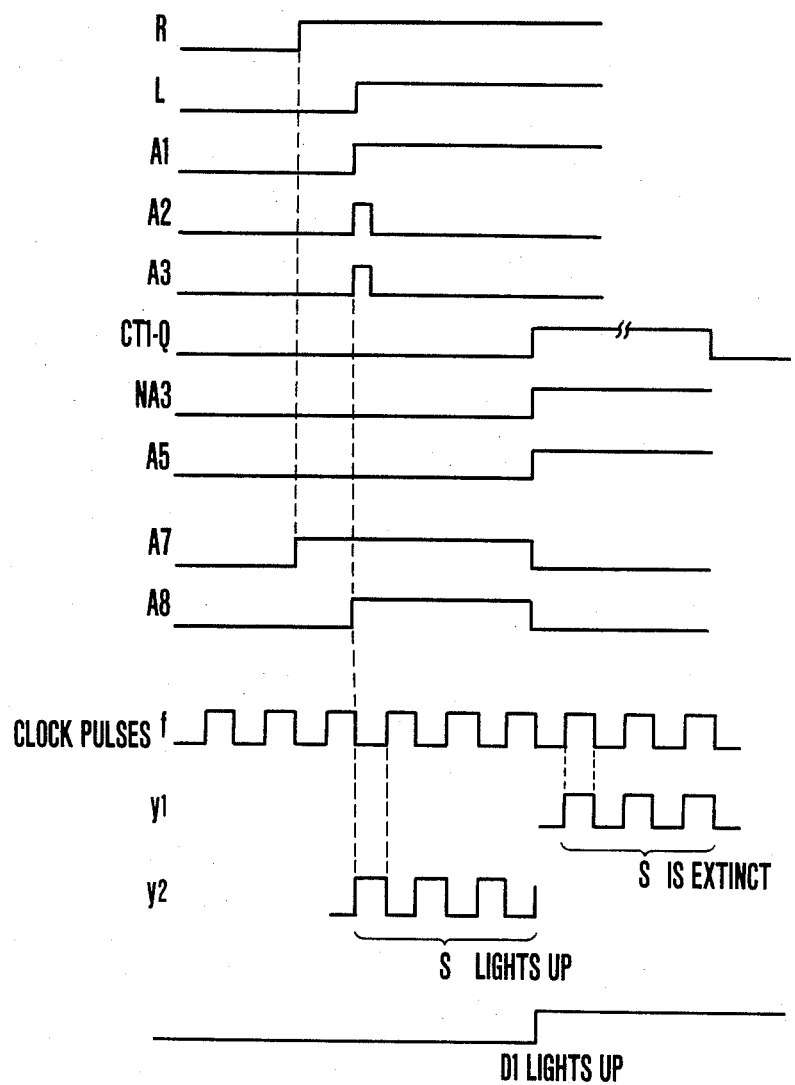
FIG. 11 is a diagram showing the operation of the circuit of FIG. 10.

Referring to the FIG. 11 timing chart, the circuit arrangement of FIG. 10 operates as follows: When the camera power supply switch provided with the display device of FIG. 10 is closed, a reference voltage Vcc is supplied to start circuit F. A time constant circuit which consists of the resistor R1 and the capacitor C1 begins to operate. When the charge voltage of the capacitor C1 comes to exceed the threshold level of the inverter in4, the latch circuit E is reset by a signal produced from the inverter in4. A low level signal (hereinafter called "L") is then produced from the output terminal C of the latch circuit E.

When the distance measuring device (not shown) produces a signal representing an in-focus state and both the inputs R and L of the AND gate A1 are high level signals (hereinafter called "H"), the following operation takes place:

Since the latch circuit E produces a signal "L" when the start circuit begins to operate, the output of the AND gate A5 then becomes "L" and the first display element does not light up. An inverted "H" signal produced from the inverter in5 comes to one input terminal and the AND gate A6. Since both the signals R and L are at the "H" level, the output level of the NAND gate NA1 becomes "H". Accordingly, the output level of the AND gate A6 also becomes "H". Therefore, both the AND gates A7 and A8 produce "H" outputs. As for Right and Left input signals for the second display element S, since the clock pulse signal "f" is supplied through a common terminal, the outputs of the AND gates A7 and A8 come to be in an antiphase relation to the clock pulses "f" as shown at Y2 in FIG. 11. Therefore, a potential difference is produced between the electrodes of the liquid crystal display device S and a display is made by the indicating marks 3a and 3b.

Next, the first operation circuit C operates as follows: When the focused state detection signals R and L are both at an "H" level, the detecting means A1 produces an "H" output. An output signal from the flip-flop DF1, which receives clock pulses CK and the output of the AND gate A1, causes the AND gates A2 and A3 to produce one-shot pulses as shown in FIG. 11. The signal thus produced from the AND gate A3 causes the counter CT1 to being to count and to produce an "H" level output after the end of a predetermined count. The NAND gate NA5, which receives the output Q of the counter CT1 and the "H" level output of the AND gate A1, produces an "L" level output to invert the output of the latch circuit E. The AND gate A5, which receives the inverted signal from the latch circuit E and the signal from the AND gate A1, produces an "H" level output. The output of the AND gate A5 causes the first display element B to light up. With the output level of the AND gate A5 becoming "H", the inverter in5 produces an "L" level output. The "L" level output of the inverter in5 causes the AND gates A6, A7, and A8 to produce "L" level outputs. Accordingly, the phase of the input signal of the second display element S becomes the same as that of the clock pulses "f", as shown at y1 in FIG. 11. Therefore, no potential difference is produced between the two electrodes of the liquid crystal and the indicating marks 3a and 3b remain extinguished. Under this condition, therefore, the display S within the view finder visual field is put out while the display D1 lights up outside the visual field of the view finder.

In the embodiment shown in FIG. 10, when the "H" level of the focused state detection signals R and L produced from the distance measuring device as a result of a focusing operation performed by a focusing mechanism (not shown) is detected by the detecting means A1, the display element S arranged within the view finder visual field lights up first. Then, after the lapse of a predetermined period of time set by the counter CT1, the display D1 arranged outside the view finder visual field is caused to light up through the AND gate A5. With the display D1 thus lit up, the display light within the view finder visual field is immediately put out. The length of time before lighting the display outside of the view finder visual field is adjustable to a desired length by changing the setting of the counter CT1.

Figure 12:
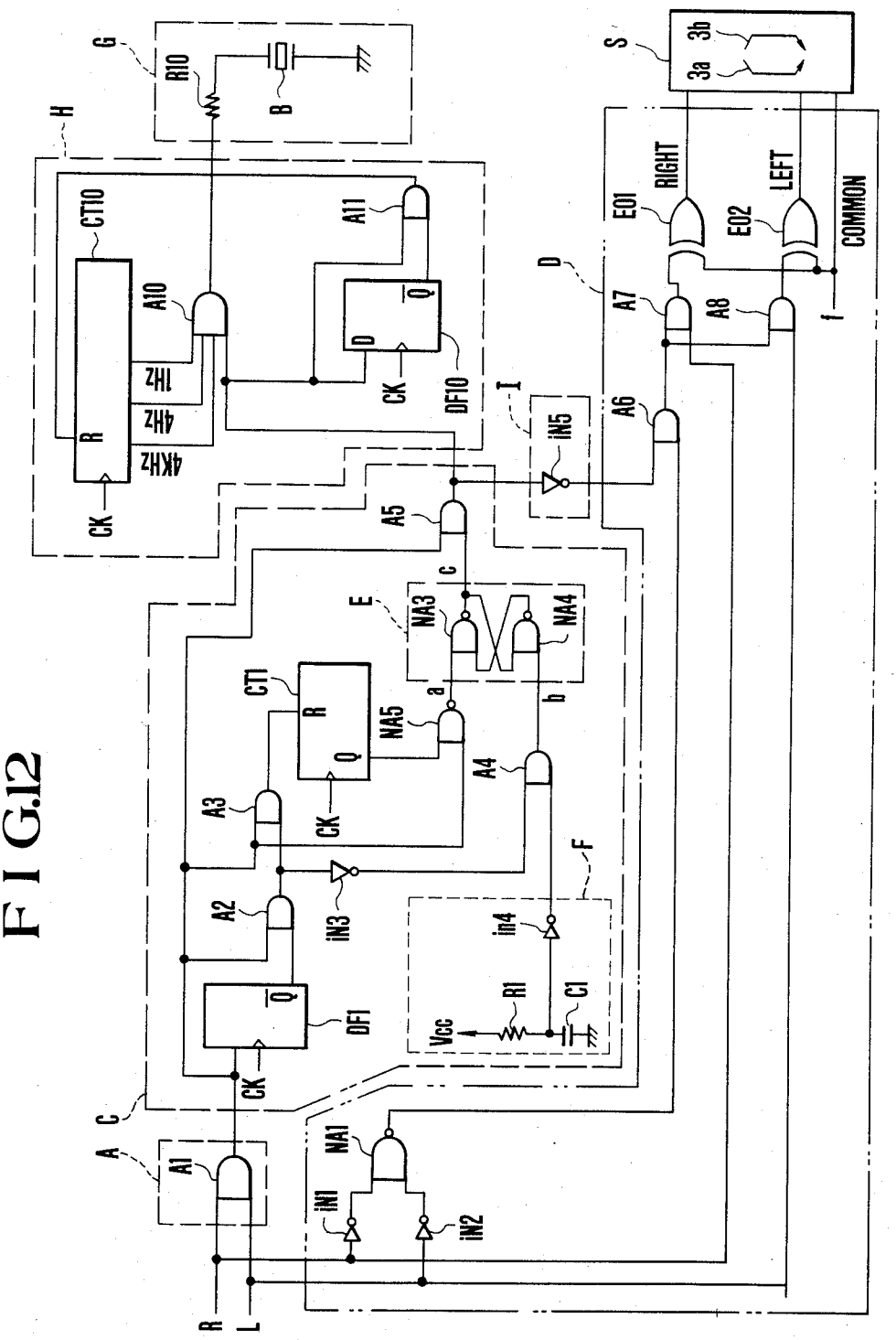
FIG. 12 is a circuit diagram showing the electric circuit arrangement of the embodiment of FIG. 9.

FIG. 12 shows another embodiment in which the first in-focus state displaying element B shown in FIG. 10 is replaced with a mechanism for making a display with a sound signal. The arrangement of blocks A, C, D, E, F, and I of this example is identical with those of FIG. 10 and thus requires no further description. Referring to FIG. 12, block G represents a sound producing mechanism which consists of a resister 10 and a sound producing element B. Block H represents an operation circuit for the sound producing mechanism G. Operation circuit H consists of AND gates A5, A10 and A11, a D flip-flop DF10 and a counter CT10. The AND gate A5 is arranged in the same manner as the AND gate A5 of FIG. 10 to receive the output of the AND gate A1 and the output c of the latch circuit E. In the circuit arrangement of FIG. 12, the AND gate A5 produces an "H" level ouput when both the focused state detecting signals R and L become "H" levels. Then, a one-shot circuit which consists of the flip-flop DF10 and the AND gate ALL produces a one-shot pulse to reset the counter CT10. The AND gate A10 then produces an AND output obtained from the 4 KHz, 4 Hz and 1 Hz outputs of the counter CT10. The sound producing means G is driven by the output of AND gate A10.

In the embodiment shown in FIG. 12, after the in-focus display S lights up within the view finder visual field and after a count output is produced from the counter CT10, the photographer is informed of the in-focus state by the sound producing mechanism G. The visible display S is put out after the sound producing mechanism G begins operation.

Figure 13:
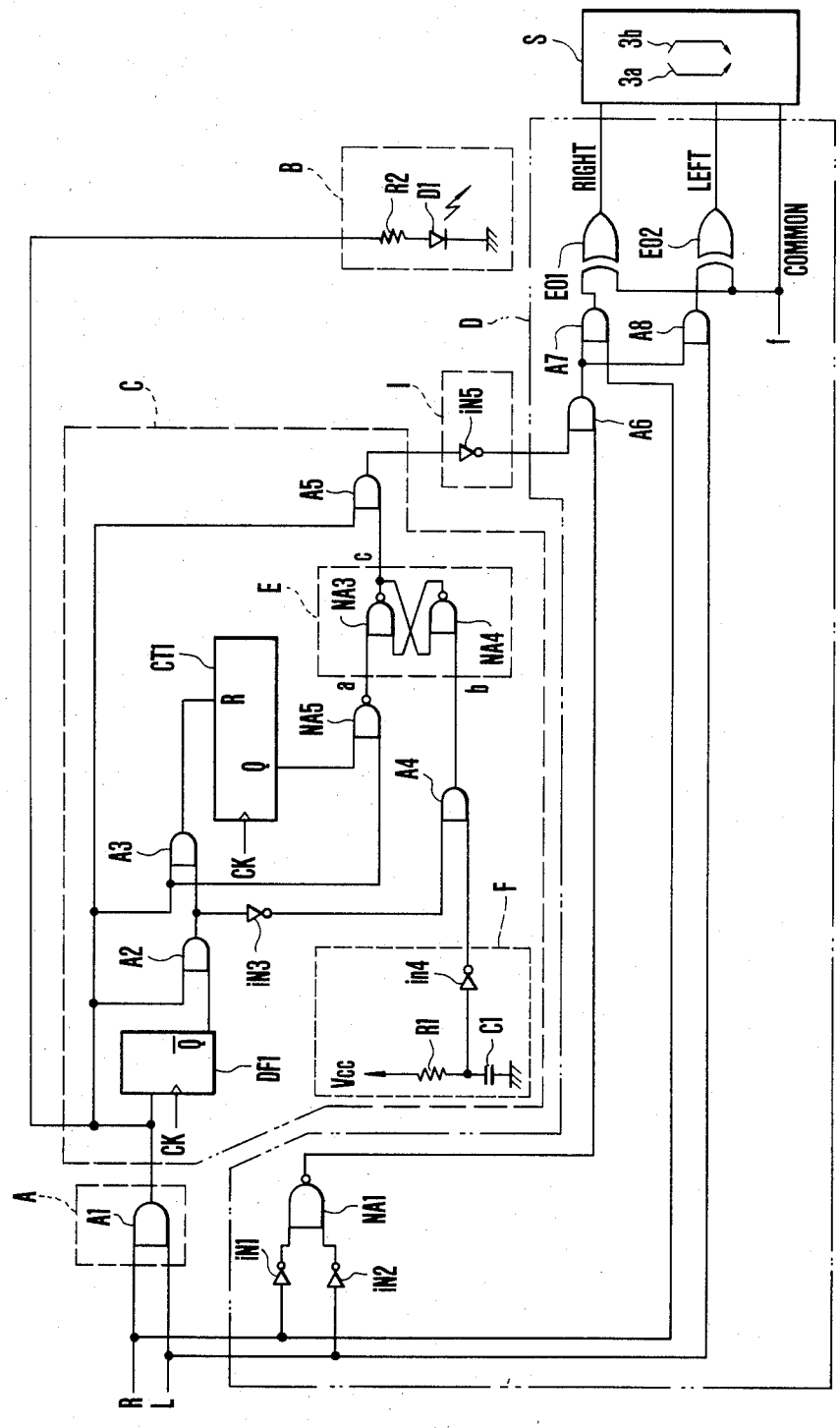
FIGS. 13 and 14 are circuit diagrams showing still further embodiments of the present invention.
Figure 14:
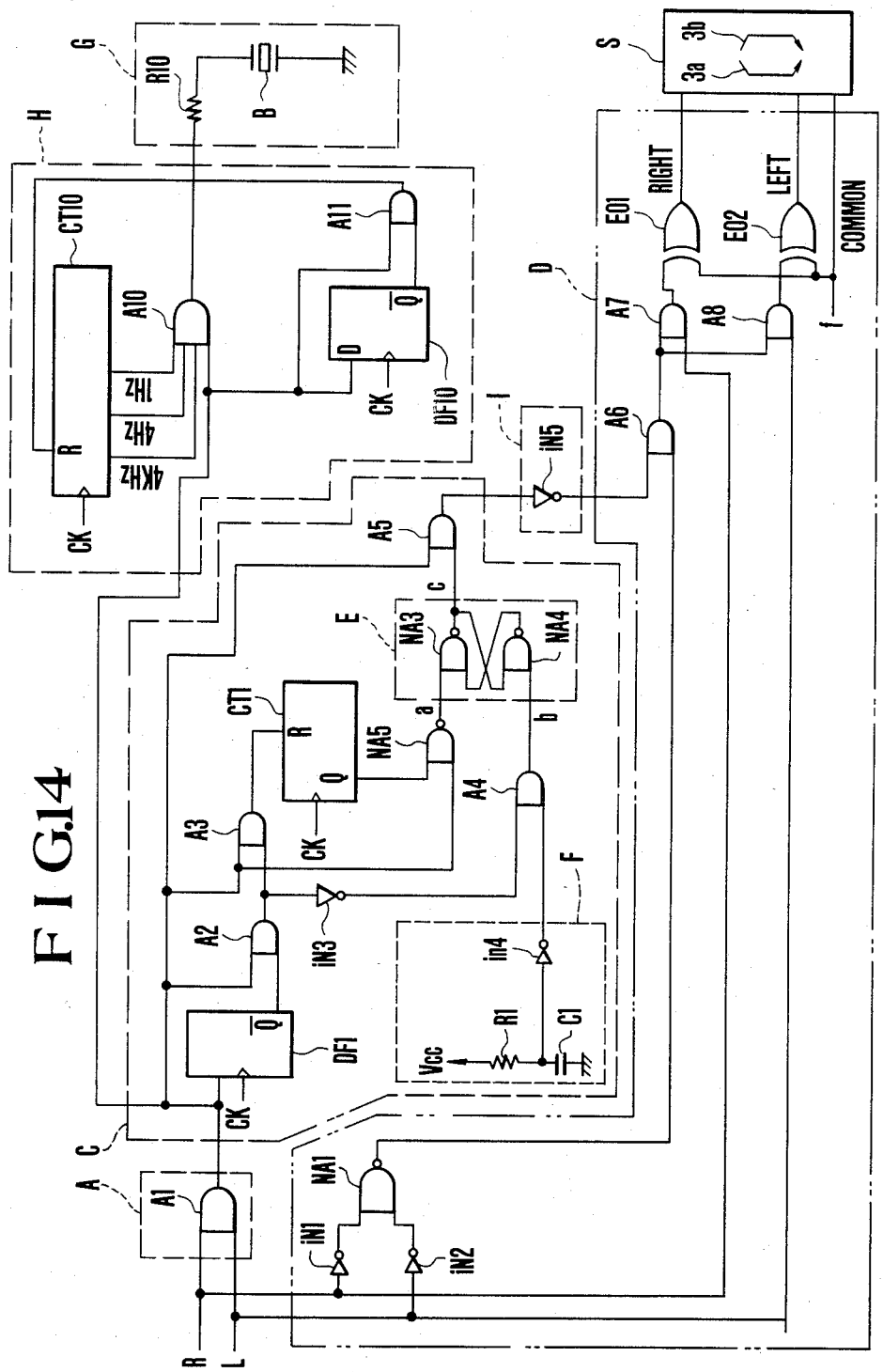

FIGS. 13 and 14 show still further embodiments of the present invention. These embodiments are arranged in such a manner that when the in-focus detection signals R and L are both at an "H" level, the LED D1 lights up or the buzzer (sound producing element) B produces a sound on the basis of a signal produced by the AND gate A1.

In the embodiment of FIG. 13, at the time of an in-focus state the LED D1 lights up and the liquid crystal display device S makes a display. After the lapse of a predetermined time the display in the view finder is extinguished.

In the embodiment of FIG. 14, at the time of an in-focus state the buzzer B produces a sound and the liquid crystal display device B makes a display. After the lapse of a predetermined time the display in the view finder is extinguished.

In accordance with the invention, as has been described in the foregoing, a camera making superimposed displays of lens-turning directions and an in-focus state is arranged to shift the super-imposed in-focus state display to a different mode of display either immediately after attainment of the in-focus state or after the lapse of a predetermined length of time following the attainment of the in-focus state. This arrangement gives the following advantages:

(1) Since the in-focus state is displayed in a mode other than the superimposed display mode, at the latest, after the lapse of a predetermined period of time, the image of an object to be photographed will never be eclipsed by the display and photographing can be carried out without any hinderance; and (2) The positive mode of display of an in-focus state according to the invention prevents the photographer from mistaking a display for disappearance of display due to a drop in power supply voltage, a malfunction of the focus detecting device, or a focus not detectable condition.

What we claim:

1. An in-focus display device for a camera, comprising:
   first detecting means for detecting a signal representing an in-focus state;
   first display means for displaying an in-focus state outside the visual field of a view finder in response to a signal from said first detecting means;
   second display means for displaying a mark indicative of an in-focus state within the view finder visual field in response to the signal from said first detecting means; and
   a control circuit for causing said first display means to effect an in-focus state display after the in-focus state display by said second display means is extinguished.

2. An in-focus state display device according to claim 1, wherein said control circuit includes:
   a first operation circuit for operating said first display means; and
   a second operation circuit for operating said second display means in response to a signal produced from said first operation circuit.

3. An in-focus state display device for a camera, comprising:
   detecting means for detecting a signal representing an in-focus state;
   visible display means for displaying a visible in-focus state within a view finder visual field in response to a signal produced from said first detecting means;
   audible informing means for indicating an in-focus state by means of a sound signal in response to the signal produced from said first detecting means;
   first operating means for operating said audible informing means; and
   changeover means for indicating the visible display means first when the in-focus condition is detected by said detecting means, and after a predetermined time putting off said visible display means to actuate said informing means.

4. An in-focus display device for a camera, comprising:
   (a) detecting means for detecting a signal representative of an in-focus state;
   (b) first display means for displaying the in-focus state outside the visual field of a view finder in response to the signal from said detecting means:
   (c) second display means for displaying the in-focus state within the view finder visual field in response to the signal from said detecting means; and
   (d) a control circuit for inhibiting the operation of said second display means after a predetermined lapse of time from detection of said in-focus state.

5. An in-focus display device according to claim 4, which further comprises a control circuit for actuating said first display means immediately in the in-focus state.

6. An in-focus state display device for a camera, comprising:
   (a) detecting means for detecting a signal representative of an in-focus state;
   (b) visible display means for displaying the in-focus state within a view finder visual field in response to the signal produced from said detecting means;
   (c) audible informing means for an in-focus state by means of a sound signal in response to the signal produced from said detecting means;
   (d) first operating means for operating said audible informing means; and
   (e) a control circuit means for inhibiting the operation of said visible display means after a predetermined lapse of time from detection of said in-focus state.

7. An in-focus displaying device according to claim 6, in which said first operating means is actuated immediately in the in-focus state.

8. An in-focus display apparatus for a camera, comprising:
   (a) detecting means for detecting a signal representative of an in-focus state;
   (b) first display means for displaying the in-focus state outside the visual field of a view finder after the in-focus state has been detected by the detecting means;
   (c) second display means for displaying the in-focus state within the view finder visual field in response to the signal from said detecting means; and
   (d) a control circuit means for inhibiting the operation of said second display means after a predetermined lapse of time from detection of said in-focus state.

9. An in-focus display apparatus for a camera, comprising:
   (a) detecting means for detecting a signal representative of an in-focus state;
   (b) visible display means for displaying the in-focus state within a view finder visual field in response to the signal from said detecting means;
   (c) audible informing means for indicating an in-focus state by means of s sound signal after the in-focus state has been detected by the detecting means; and
   (d) control means for inhibiting the operation of said visible display means after a predetermined lapse of time from detection of said in-focus state.

* * * * *